US006751880B1

United States Patent
Amron et al.

(10) Patent No.: US 6,751,880 B1
(45) Date of Patent: Jun. 22, 2004

(54) SYSTEM AND METHOD FOR OPERATING GROUPS OF LASERS TO PROJECT A VISIBLE LINE OF DEMARCATION WITHIN DISCRETE REGIONS OF AN ATHLETIC FIELD

(75) Inventors: Alan Amron, Syosset, NY (US); Brian K. Dinicola, Monroe Township, NJ (US)

(73) Assignee: First Down Laser Systems, LLC, Las Vegas, NV (US)

( * ) Notice: Subject to any disclaimer, the term of this patent is extended or adjusted under 35 U.S.C. 154(b) by 0 days.

(21) Appl. No.: 10/385,218

(22) Filed: Mar. 10, 2003

Related U.S. Application Data

(63) Continuation-in-part of application No. 10/320,304, filed on Dec. 16, 2002.

(51) Int. Cl.[7] .............................................. G01C 15/06
(52) U.S. Cl. ........................................ 33/289; 473/490
(58) Field of Search .......................... 33/227, 286, 289, 33/DIG. 21; 473/415, 490

(56) References Cited

U.S. PATENT DOCUMENTS

| 3,300,861 | A | * | 1/1967 | Lilly | 33/289 |
| 3,741,662 | A | * | 6/1973 | Pioch | 473/490 |
| 3,752,588 | A | * | 8/1973 | Chapman | 33/289 |
| 4,090,708 | A | * | 5/1978 | McPeak | 33/289 |
| 5,976,039 | A | * | 11/1999 | Epel et al. | 473/490 |
| 2002/0151385 | A1 | * | 10/2002 | Hemphill | 473/415 |
| 2002/0178596 | A1 | * | 12/2002 | Malard et al. | 33/286 |

* cited by examiner

Primary Examiner—G. Bradley Bennett
(74) Attorney, Agent, or Firm—Brian K. Dinicola

(57) ABSTRACT

The surface of an athletic field is divided into multiple regions or zones. A first of these zones is served by a first group of laser sources. A second of the zones is served by a second group of laser sources. Each group includes at least two lasers arranged to project visible light onto the field from opposite lateral sides of the field. The output from each group is focused onto the field so as to form a composite line across the field—anywhere within the associated zone. A controller is operative, in response to receipt of a command from either a keyboard terminal or a wireless, hand held user interface device, to select one of the first group of laser sources and the second group of laser sources to project a composite temporary visible line. The zones may be contiguous or may be separated by one or more intermediate zones, with each intermediate zone having its own associated group of laser sources.

18 Claims, 4 Drawing Sheets

SYSTEM AND METHOD FOR OPERATING GROUPS OF LASERS TO PROJECT A VISIBLE LINE OF DEMARCATION WITHIN DISCRETE REGIONS OF AN ATHLETIC FIELD

REFERENCE TO RELATED APPLICATIONS

This application is a continuation-in-part of U.S. patent application Ser. No. 10/320,304 filed on Dec. 16, 2002 and entitled "SYSTEM AND METHOD FOR DYNAMICALLY MARKING ATHLETIC FIELDS USING A HAND-HELD INTERFACE".

This application is also related to co-pending U.S. patent application Ser. No. 10/385,219 filed simultaneously herewith and entitled "SYSTEM FOR OPERATING ONE OR MORE LASERS TO PROJECT A VISIBLE LINE ONTO A GRASS-COVERED SURFACE".

BACKGROUND OF THE INVENTION

1. Field of the Invention

This invention relates generally to the use of visible reference lines during sporting or entertainment events and, more particularly, to systems employing at least one laser light beam source to generate such visible reference lines.

2. Discussion of the Background Art

To accommodate a sporting event, a series of reference and/or boundary lines may be defined upon a grass-covered surface using, for example, paint, powders, dyes and the like. Such methods of marking are entirely satisfactory so long as the reference lines themselves are static during the entire event. Where the position of a boundary or other line of demarcation changes dynamically during the event, however, markings of the permanent type cannot be used.

In the game of football, for example, a key objective of the team in possession of the ball (i.e., the "offense") is to retain possession of that ball by moving it far enough down the field. Specifically, the offense is given a set of four plays or "downs" to advance the ball by at least ten yards. Each time that distance is reached or exceeded, the offense is said to have crossed a "first down" line, a new set of downs is earned, and the offense is allowed to continue its advance toward the goal line of the opposing team (i.e., the "defense"). If the offense falls short, however, possession is lost and the two teams reverse their roles. A regulation football field has a length of 100 yards and 53 yards. Thus, by way of example, a team gaining possession of the ball at its own 20 yard line must move the ball a total of eighty yards in order to reach the end zone of the opposing team.

In numerous occasions throughout an average football game, the officials of the game must resort to sideline markers to establish whether the offense has advanced the ball by the required distance. The standard alignment system that is utilized is generally a pair of poles connected by a 30-foot long chain. The relative position of the football is measured by locating a first of these poles at the approximate location of the initial line of scrimmage and moving the second as far forward as possible. Each time this measurement is made, the game must be delayed and the yard markers must be carried from the sidelines to the place on the field where the official has "spotted" the ball. Although the game of football has become a relatively complex sport, involving literally hundreds of millions of invested dollars, this time consuming system has remained relatively the same since the conception of the sport.

A number of approaches intended to ameliorate the aforementioned deficiencies have been proposed over the years, but none of them has met with any degree of commercial success. U.S. Pat. No. 3,741,662, entitled "VISIBLE LINE MARKER" and issued to Pioch on Jun. 26, 1973, U.S. Pat. No. 3,752,588, entitled "LASER FOOTBALL FIRST DOWN MEASURING DEVICE" and issued to Chapman on Aug. 14, 1973, and U.S. Pat. No. 4,090,708 entitled "APPARATUS FOR MARKING FOOTBALL FIELDS" and issued to McPeak on May 23, 1978. Each of the aforementioned patents involves the use of lasers for the purpose of marking visible lines of demarcation on an athletic field. One of the principal drawbacks of these systems is the time-consuming and tedious method of operation.

Both Chapman and Pioch involve the use of track mounted, sliding projectors that are located at the sidelines and just a few feet above the field level. The lasers are mounted for oscillation in a vertical plane and the projected low intensity beam developed by each must strike the field at points of reference lying on an imaginary line of demarcation defined by the intersection of the vertical plane with the field surface. Accordingly, it is necessary for the operator to manually position the projector for each reference point established. Like Pioch and Chapman, McPeak discloses the use of a laser assemblies adapted to accommodate sliding movement along the sidelines of a football field. McPeak, however, teaches that two oppositely directed beams should be aimed at a level above (i.e., "adjacent and parallel to") the field surface.

Another drawback associated with the aforementioned systems is that the low-intensity output of these lasers is far too low to be visible by the players, let alone by an audience in, for example, a stadium setting. Indeed, the aforementioned systems are intended for use only in making a first down measurement determination after each close play. As it turns out, players intent on getting the ball past the first yard line—and focused on the sideline markers long enough to be "blindsided" by the defense—have either fumbled the ball or suffered very serious neck and back injuries.

Television networks have recently implemented an image pre-processing system which allows viewers of televised football games to see a so-called "virtual" first down line that digitally projects, in real time, a visible line onto video frames recorded by the television camera, the line being displayed on a viewer's television set so that it appears to extend between the first down sideline markers. Unfortunately, neither the players, game officials, nor the fans attending such games can actually see this virtual line. It is thus reasonable to conclude that given the rapid and widespread adoption of a virtual adoption of a virtual visible line marking system—whose enjoyment is strictly limited to television viewers, it has heretofore been assumed that it would be impossible or impracticable to project a real, visible line onto surfaces like those of athletic fields. Although there are many possible explanations for this conclusion, it is believed by the inventors herein that the poor light scattering properties of grassy surfaces is at least partially to blame. Blades of grass are randomly oriented and tend to scatter incident light in several directions. The inventors herein have discovered that from distances in excess of one hundred feet or so, a single beam of even relatively high intensity (e.g., 40 joules/second) will be reflected in such a way that it cannot be seen from most camera or fan viewing angles within a stadium.

A continuing need therefore exists for a visible line marking system that is simple to operate, accurate enough to allow its use by officials at sporting events, and of sufficient intensity to be viewed by players, large audiences, and television viewers alike.

A need also exists for a system capable of projecting a variety of other images, onto surfaces having non-uniform light scattering properties, which can be seen from different perspectives and from considerable distances even in daylight conditions.

SUMMARY OF THE INVENTION

The aforementioned needs are addressed, and an advance is made in the art, by an apparatus for providing at least one temporary visible reference line on a surface, as for example, an athletic field, within the field of view of at least one video camera. An illustrative system constructed in accordance with a first embodiment of the present invention comprises a first laser source disposed at a first elevated, stationary location relative to the surface, the first laser source being operative to emit a first laser beam having a wavelength of between 400 nm and 750 nm and to sweep the first laser beam along a selectable path upon the surface so as to form a temporary line thereon. The system further comprises a second laser source disposed at a second elevated, stationary location relative to the surface and different from the first stationary location, the second laser source being operative to emit a second laser beam having a wavelength of between 400 nm and 750 nm and to sweep the second laser beam across the selected path so as to form, with the first laser beam, a composite temporary visible line as, for example, a line of demarcation during a football game.

It is expected that the power delivery requirements for each laser source can vary considerably for each installation, depending upon such variables as the range of expected ambient lighting conditions, the distance each beam must traverse before contacting the surface, and the actual width dimension of the line to be displayed. For a line width of approximately 3 to 6 inches (8 to 15 cm), excellent results have been achieved from distances in excess of several hundred feet using two 40 W, frequency doubled, Q-switched Nd:YAG lasers each adapted to generate laser pulses at a wavelength of 532 nm. Emission at this wavelength is especially preferred since it is very close to the peak (555 nm) of the human eye's sensitivity. By comparison, in an argon ion laser operating in continuous wave (cw) mode, roughly half of the output is at 514 nm (58% as bright as the same beam at 555 nm), another 30% is at around 480 nm (18% as bright) and the remaining 20% is at around 440 nm (barely visible to he human eye). Thus, such an argon laser would have to deliver up to three or four times as much power to match the visibility of an Nd:YAG laser.

The surface of the athletic field is divided into multiple regions or zones. A first of these zones is served by the first and second laser sources, these sources collectively comprising a first group of laser sources. A second of these zones is served by third and fourth laser sources, the third and fourth laser sources collectively comprising a second group of laser sources. Advantageously, the use of multiple groups of laser sources allows the distance over which each beam must travel to be kept within a range that is consistent with both the intensity and divergence characteristics of the laser output and with the line width criteria needed for proper viewing and accuracy for all positions of the visible line. In accordance with an illustrative installation of the present invention—a football field that is subject to bright daylight illumination conditions—the first and second laser sources are positioned beyond and above opposite lateral sides of the 25 yard line on one-half of the field, and the third and fourth laser sources are positioned beyond and opposite lateral sides of the 25 yard line on the other half of the field.

It should be emphasized that there is no requirement that any pair of lasers be located along a line transverse and perpendicular to the lateral sidelines of the field. Thus, for example, the first laser source might be beyond and above the twenty-yard line of a first lateral side of the field and the second laser source might be beyond and above the thirty-yard line of the second lateral side. Still another laser source might be at the ten-yard line of either the first or the second line, such that all or any two of them may be used to generate the composite line. Preferably, however, the various laser sources are arranged so as to cause the incident light from different beams to be scattered in a way that allows spectators from as many different viewing angles as possible to see the line clearly. In that regard, there is no requirement that the respective laser sources be located at the same elevated vertical position relative to the field. Needless to say, it is considered within the level of skill of the ordinary artisan to obtain, whether empirically or by predictive modeling, a juxtaposition of laser sources that is ideally suited to the specific lighting conditions and overall dimensions associated with any particular indoor or outdoor location.

Based on the location on the field upon which the visible line is to be projected, a control system determines which laser sources are to be operated and in what order. For example, if an official during a football game makes a determination that a new first down has been established, then it may be required to move the visible line from a position within one region of the field surface, for which coverage is provided by one group of laser sources, to a second region of the field surface that is covered by a different group of laser sources. In accordance with present invention, when the official inputs a line position command via a wireless, handheld user interface, the control system operates the respective groups of laser sources so as to seamlessly transfer the line projection task from one group to the next.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description are merely exemplary of the invention, and are intended to provide an overview or framework for understanding the nature and character of the invention as it is claimed.

BRIEF DESCRIPTION OF THE DRAWINGS

The invention will be better understood by reference to the detailed description of the invention that follows, taken in conjunction with the accompanying drawings, in which.

DETAILED DESCRIPTION OF THE INVENTION

The present invention is based, in part, on the recognition that even non-smooth surfaces can reflect incident beams of coherent light in a way that allows a line projected thereby to be seen from most radial viewing perspectives. As used herein, the phrase "non-smooth target surface" is intended to encompass any surface that is characterized by a tendency to scatter incident light in a random and non-uniform manner. In connection with the exemplary football stadium installation depicted in FIGS. 1 and 2, it will be understood that the term "non-smooth target surface" refers to the surface of an athletic field that is entirely or substantially covered by real or artificial turf grass. By appropriate beam wavelength, output power level selection, and placement of multiple groups of two or more laser sources, the poor light scattering performance of such non-smooth surfaces can be overcome so that spectators can easily see the line(s) so-projected—from most, if not all, vantage points within the seating area of a stadium or arena—even in peak daylight ambient lighting conditions.

As used herein, the term "laser sources" is intended to refer both to arrangements in which a coherent laser beam source and scanning projectors are integrated into a single housing at a common mounting location and to arrangements in which the laser sources themselves consist of scanning projectors configured to receive, via a waveguide (e.g., optical fiber) distribution network, the output of a plurality or "bank" of lasers whose respective beams are commonly coupled into a single waveguide for delivery to any selected laser source. The term "laser sources" should also be understood to encompass other line forming arrangements besides those which rely upon the movement of mirrors to implement a "scanning" operation. Alternate embodiments of the present invention, for example, may employ laser sources in which the coherent beam developed intersects a single lens element having a negative optical power in one cross section and a positive optical power in another cross section. One such lens element is described in U.S. Pat. No. 6,069,748 entitled "Laser Line Generator System" issued to Joseph Bietry on May 30, 2000. Unlike conventional cylindrical lens arrangements—which provide for a gaussian distribution of the energy, the Bietry lens arrangement evenly distributes the optical energy across the entire width and length of the line.

It should also be understood that although the exemplary embodiments illustrated and described herein relate specifically to the projection of a visible straight line onto the grass surface of a football field, the teachings of the present invention are equally applicable to the projection of other types of lines—including images, logos, advertising messages, and the like—onto any surface covered by real or artificial turf.

Figure 1:
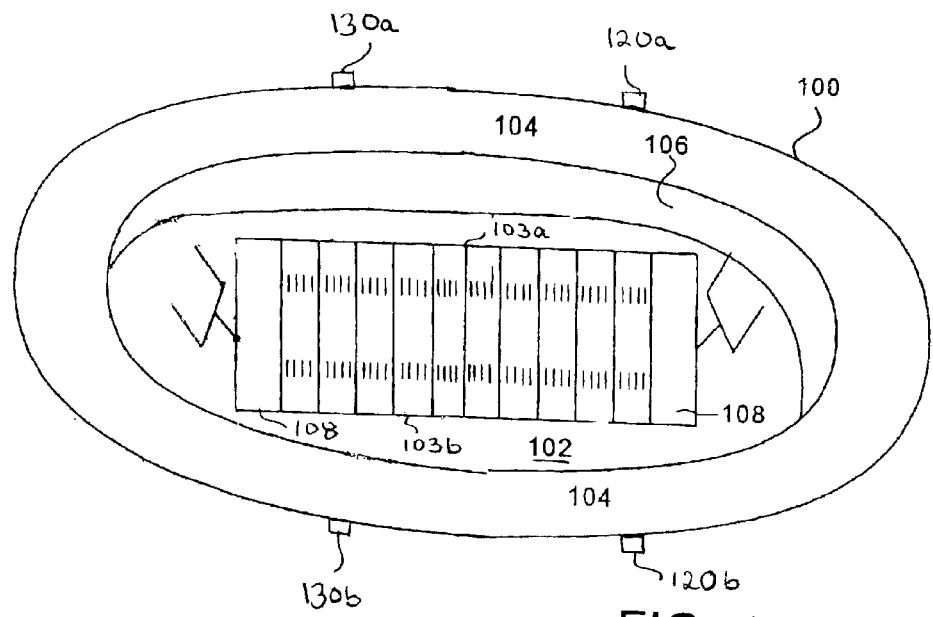
FIG. 1 is a perspective view of a football stadium equipped with a visible line marking system in accordance with an illustrative embodiment of the present invention.

FIG. 1 is a partial view of an exemplary stadium 100 having associated therewith a visible line marking system constructed in accordance with the teachings of the present invention. In the center of stadium 100 is an athletic field 102 covered with grass—which can be either real or artificial turf grass—and marked with a rectangular grid pattern to define a football playing area. The width of this grid pattern is delineated by, inter alia, first and second lateral boundary lines indicated generally at 103a and 103b, which are separated by a distance of approximately fifty-three yards. At regular increments of ten yards, eleven transverse reference lines extend across field 102, interconnecting first and second boundary lines 103a and 103b. Collectively, these transverse reference lines define the one hundred yard area of field 102 that separates the end zones 108 of each team.

Surrounding the grass-covered surface of football field 102 is a seating area, indicated generally at 104, designed to accommodate a large number of spectators. As will be readily appreciated by those skilled in the art, the seating area of a typical professional league football stadium can easily accommodate several scores of thousands of fans, and many college arenas provide seating for at least tens of thousands. In that regard, seating area 104 can consist of three or more distinct tiers as, for example, a lower deck, mezzanine, and upper deck area. Between seating area 104 and playing field 102 is a retaining wall 106, which serves as a barrier between the spectators and the players and officials on field 102. It goes without saying that the spectators expect a substantially unobstructed view, from any seat within seating area 104, of the action taking place on field 102.

A line marking system constructed in accordance with an illustrative embodiment of the present invention includes a first pair of laser sources indicated generally at 120a and 120b and a second pair of laser sources indicated generally at 130a and 130b. To ensure coverage of the entire length and width of the playing area, each laser source is positioned at a location that is high above the grass-covered surface of field 102—on the order of from about fifty to about two hundred and fifty feet or so depending upon the intensity, shape and divergence of the coherent beam generated and upon the availability of a suitable mounting location. Although it is certainly conceivable that certain enclosed (e.g., domed) environments might offer a mounting location that is directly above athletic field 102, each laser source as sources 120a and 120b is typically mounted well beyond lateral boundary lines 103a and 103b—on the order of, say, about fifty to one hundred and fifty feet outside lines 103a and 103b. In the exemplary embodiment of FIG. 1, for example, each laser source is positioned directly above seating area 104, with care being taken to ensure that the respective beams projected are sufficiently distant from the spectators at all times as to comply with the guidelines prescribed by the Center for Diagnostic and Radiological Health, a department of the U.S. Food and Drug Administration. The beam may therefore traverse a distance of hundreds of feet before reaching the surface of field 102, and may do so at an angle of incidence that is typically within a range of from about fifteen to about ninety degrees.

Under certain ambient lighting and other installation conditions, it is contemplated that a surface may be divided into multiple regions or zones. This allows the distance over which each beam must travel to be kept within a range that is consistent with the intensity, divergence and line width demands for proper viewing. By way of illustrative example in which the surface is a football field that is subject to daylight illumination conditions, first and second laser sources 120a and 120b are positioned above opposite lateral sides of the 25 yard line to provide coverage for half the area of field 102—a region designated as area 102b in FIG. 3, while third and fourth laser sources 130a and 130b are positioned opposite lateral sides of the 25 yard line on the other half of the field, a region designated as area 102a in FIG. 3. Such an installation decreases the maximum angle, relative to the vertical, at which each beam strikes field surface 102. A beam emitted by laser source 120a from a point 200 feet above a lateral side of the 25 yard line will be disposed entirely in a vertical plane relative to horizontal target surface 102b, and thus at an angle of zero degrees relative to the vertical. A beam directed from that same source but along a selectable path 25 yards away (e.g., at the 50 yard line) will strike target surface at an angle of twenty degrees relative to the vertical. To be useful as an official line of demarcation in a football game, it is believed that the angle should be no greater than 20 degrees. This is because the tip of the football is three inches above the ground. In the foregoing example, the trailing edge of the visible composite line will cross the tip of the football about one inch in front of where it actually crosses the field. The greater the greater the angle, the greater the deviation.

Figure 2:
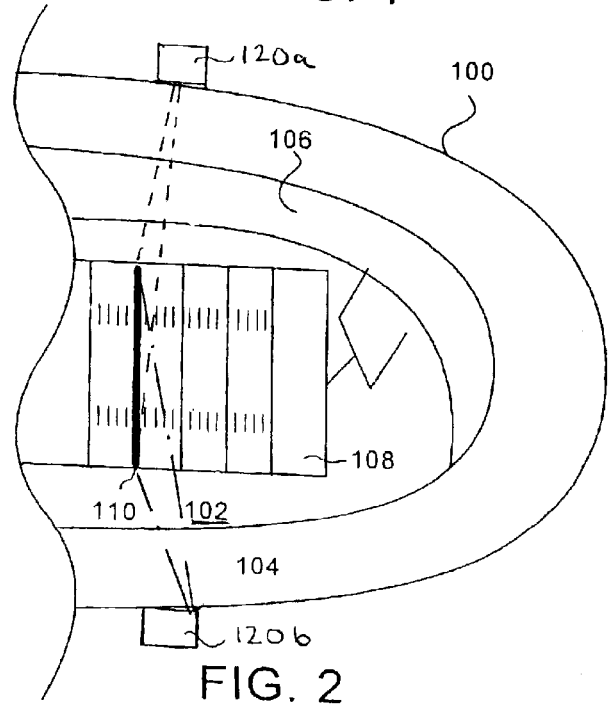
FIG. 2 is a partial perspective view of the football stadium of FIG. 1, depicting the projection of a visible line of demarcation (i.e., a "first down" line) onto a portion of the field surface covered by real or artificial grass.
Figure 3:
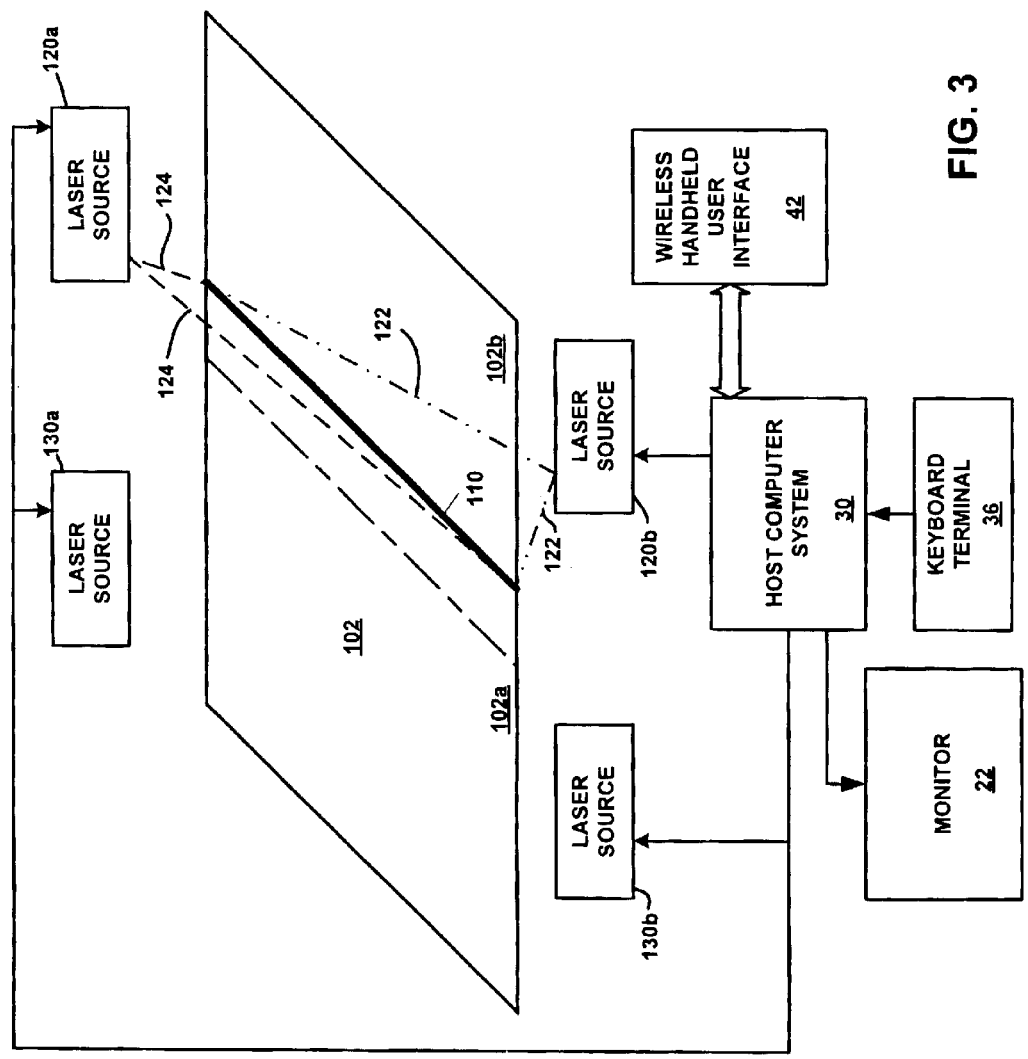
FIG. 3 is a block diagram schematically depicting the components of an exemplary visible line marking system employing two pairs of synchronized coherent laser sources.

As such, and in accordance with the illustrative embodiment of the present invention depicted in FIG. 1, each pair of laser sources is dimensioned and arranged within stadium 100 to provide coverage for only a portion of the entire of the field area. As best seen in FIGS. 2 and 3, laser sources 120a and 120b—in a manner to be described shortly—are operated together so as to jointly project, from two different angles, a composite visible line 110 onto the field region 102b. As indicated above, by appropriate beam wavelength, output power level selection, and placement of the multiple laser sources, the poor light scattering performance of the grassy field surface 102 can be overcome and spectators can easily see the line so-projected from most, if not all, vantage points within seating area 104—even in peak daylight ambient lighting conditions.

A simplified block diagram of an illustrative visible line marking system 10 constructed in accordance with the teachings of the present invention is shown in FIG. 3. Essentially, system 10 includes a plurality of groups of laser sources, of which only a first group (comprising first laser source 120a and second laser source 120b) and a second group (comprising third laser source 130a and fourth laser source 130b) are shown. It will readily appreciated by those skilled in the art that any number of intermediate groups of laser sources may be added, and the relative spacing between the sources of all groups adjusted, in order to ensure that the projected line 110 (FIG. 2) can be clearly seen from all desired viewing angles.

In this regard, the inventors herein have observed that the intensity of light reflected by grassy surfaces is subject to substantial local variations depending upon the vertical and angular position of the observer relative to the location where a laser beam strikes a region of the target surface. In locations where the amount of ambient illumination is relatively high such, for example, a stadium whose grass field is exposed to full sun or even bright incandescent lighting, light projected by a single coherent laser source is reflected by the randomly oriented blades of grass in such a way that it can be clearly seen from some seating locations and barely seen from others. In accordance with the present invention, the light from two or more beams, as beam 124 output by first laser source 120a and beam 122 output by second laser source 120b, are used in order to ensure that the light reflected by target surface 102b can be clearly seen from any viewing location.

With continuing reference to FIG. 3, it will be seen that the respective laser sources are controlled by host computer system 30, with which there are associated a monitor 22, a keyboard terminal 36, a hand-held wireless interface for supplying line projection position and operation commands via an RF link. In the exemplary embodiment, the software that controls movements of the beams developed by each laser source is configured to allow line projection position and operation commands to be supplied by either keyboard terminal 36 or by wireless interface 42 (via an RF link). To make the most effective use of the capacity to implement line position commands using keyboard terminal 36, monitor 22 is configured to present a view (which may be an actual view taken by video camera or a digitally simulated scene) of football field 102. Alternatively, or in addition to the keyboard command capability, commands for position the visible line are entered by wireless interface 42 via an RF link. To prevent unauthorized interference with the proper operation of system 10, wireless interface 42 and wireless transceiver 43 are configured with the ability to encrypt and decrypt the signals exchanged over the RF link established therebetween. To ensure the operability of the system in a variety of pre-existing stadiums and arenas where certain wireless frequencies may already be assigned to use for other purposes, each of wireless interface 42 and wireless transceiver 43 is further equipped with a frequency selection switch by which the system installer/operator can choose an available, non-interfering transmission frequency from among a plurality of selectable frequencies.

Typically, the wireless interface will be used by one of the officials on the field charged with the task of establishing an accurate position of the ball. There are situations in football where the "spotted" position of the ball is automatically specified to be the twenty yard line, as where the ball is punted or kicked off into the end zone. In these cases, entry of the line projection position command by the official requires nothing more than a single button depression, system 30 being equipped with a controller that receives the corresponding command and instructs the appropriate group of laser sources to project the visible line at the thirty yard line (i.e., ten yards from the spotted twenty yard line). In cases where the position is not so defined, a two step process is required.

A fine adjustment button or thumbwheel (not shown) of user interface 42 is depressed until the trailing edge of the visible line just contacts the forward tip of the football. As will be explained in greater detail shortly, these movements are controlled by a projection control board within host computer 30. Once the official has properly defined the new line of scrimmage in this fashion, he need only make one more button depression. That is, user interface 42 is further equipped with a ten-yard increment button which transmits a command to the projection control board within host computer 30.

Figure 4:
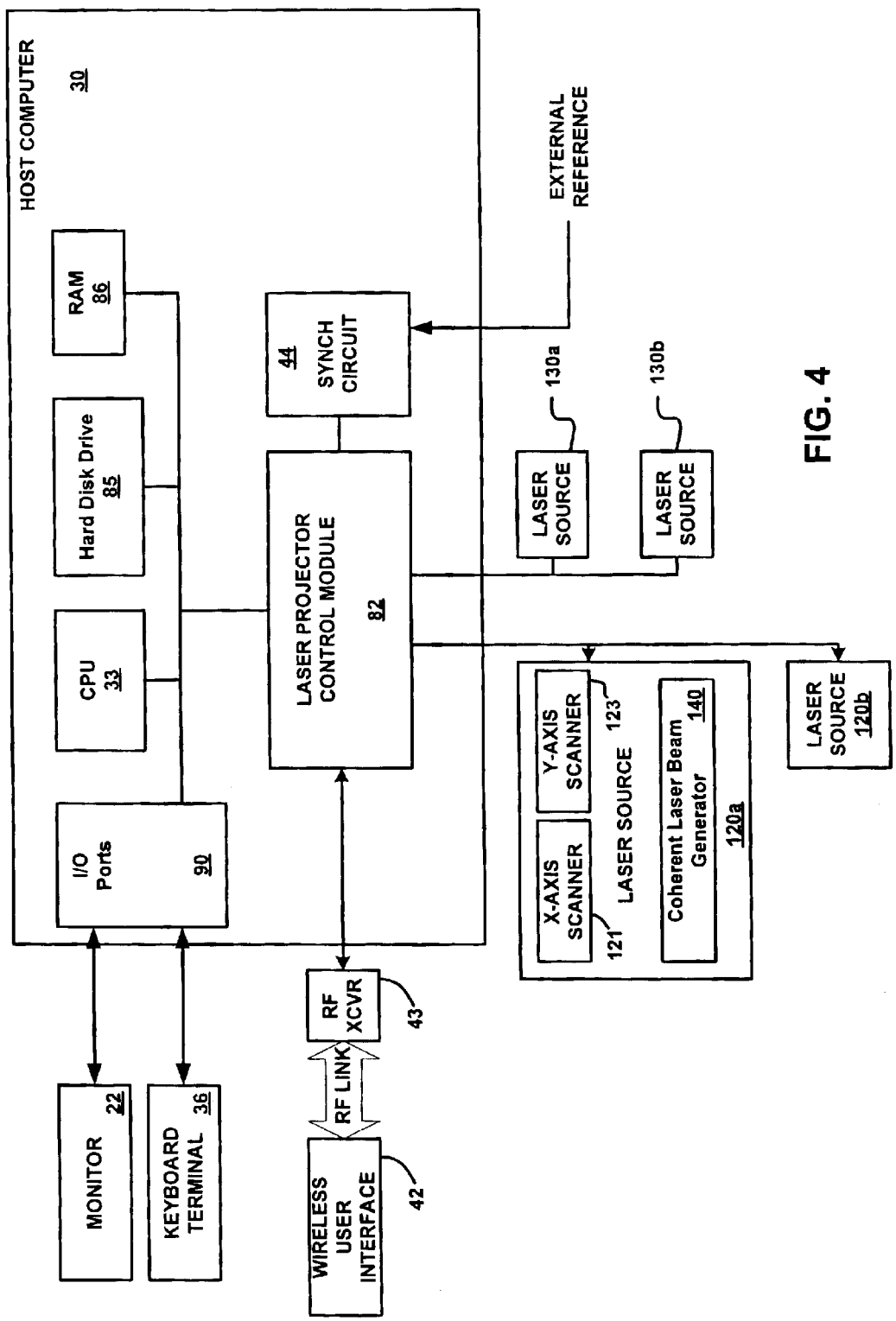
FIG. 4 is a block diagram depicting, in greater detail, the various functional elements of the exemplary visible line marking system of FIG. 3.

Turning now to FIG. 4, it will be seen that each laser source as source 120a comprises first and second galvanic scanners indicated generally at reference numerals 121 and 123, respectively. Such scanners are found in conventional laser projectors, and as used therein, galvanic scanner 121 controls movement in the X-axis direction of a coherent laser beam developed by beam generator 140. Likewise, galvanic scanner 123 controls movement in the Y-direction. Considering the width direction of field 102 between boundaries 103a and 103b to constitute the Y-direction, a visible line is generated by causing beams 122 and 124 (FIG. 3) to move fast enough in that direction to create a composite temporary visible line at a desired location on target surface 16.

Essentially, a composite visible line is formed at a desired location by repeatedly and rapidly scanning target surface 102 with each of beams 122 and 124 such that each beam strikes target surface 16 at many points along a selectable path. An exemplary selectable path is identified by reference numeral 110 in FIG. 2, it being understood that a change in the specific location of the temporary visible line—in this case a straight line across surface 102b—is implemented through operation of the respective X-and Y-scanners of each of laser sources 120a and 120b. As will be readily appreciated by those skilled in the art, each scanner as scanners 121 and 123 includes mirror (not shown) that deflects the beam. Working together, scanners 121 and 123 are operative to direct the corresponding beam at any selectable point within coverage region 102b so as to thereby generate a temporary visible line thereon.

To enable accurate positioning of a visible line along a selected path as path 110 (FIG. 2), scanners as scanners 121 and 123 are preferably closed-loop galvanic scanners (also called "position detecting" scanners). Scanners of this type are commonly used in the laser light entertainment industry and are compatible with a wide variety of commercially available laser graphics software packages. Acceptable performance has been achieved using scanners that are capable of directing the beam to 24,000 to 30,000 discrete points along selected path 110 every second. Scanning assemblies suitable for use in the present invention have been assembled, for example, using two of Cambridge Technology's model 6800 scanners and matching model 6580 amplifier circuit boards.

As a safety precaution, each laser projector preferably includes a conventional shutter mechanism (not shown) such, for example, as an acoustic optical modulator (AOM) for turning off the beam in the event, for example, a malfunction prevents proper movement of each scanning beam. In the event system 10 may be called upon to create two or more distinct and unconnected visible lines, the AOM's may also be used to implement a blanking function whereby the beam is turned off as it moves between them.

Optionally, each laser source may further include a conventional beam expander (not shown) in order to increase the diameter of the beam or a conventional collimator (not shown) for altering its divergence. In a typical stadium installation, it is anticipated that laser sources as sources 120a and 120b will be mounted anywhere from about 75 to about 200 feet above the level of target field surface 102. Consequently, beams 122 and 124 will traverse a considerable distance before striking surface 102b. As will be readily appreciated by those skilled in the art, the need for expansion or collimation of beams 122 and 124 is purely a function of the initial beam diameter and the desired thickness of the visible line as formed on the target surface. A more challenging aspect of projecting beams over such distances, especially in full sun illumination conditions, is that of finding lasers capable of delivering coherent beams of sufficient power and intensity to form a visible composite line.

For a line width of approximately six inches (15 cm), excellent results have been achieved in a stadium environment (i.e., from distances in excess of several hundred feet) using two 40 W, frequency doubled, Q-switched Nd:YAG lasers each adapted to generate laser pulses at a wavelength of 532 nm. Emission at this wavelength is especially preferred since it is very close to the peak (555 nm) of the human eye's sensitivity. By comparison, in an argon ion laser operating in continuous wave (cw) mode, roughly half of the output is at 514 nm (58% as bright as the same beam at 555 nm), another 30% is at around 480 nm (18% as bright) and the remaining 20% is at around 440 nm (barely visible to he human eye). Thus, an argon laser would theoretically have to deliver up to three or four times as much power to match the visibility of the Nd:YAG laser. Notwithstanding the relative difference in visibility, the inventors herein contemplate that one or more cw-mode lasers can be used in conjunction with one or more pulse mode lasers to provide a single, composite visible line, if desired. Moreover, and with particular regard to an illustrative embodiment that uses two laser sources to generate each visible line, it is also contemplated that the first laser source may be configured to deliver a beam which has a different power level than the second laser source, and that the respective power levels may be altered as necessary to compensate for different ambient lighting conditions.

The use of Nd:YAG lasers has heretofore been regarded as unsuitable for so-called laser graphics applications because they tend to produce dotted, rather than continuous lines. Advantageously, the use of two or more lasers in accordance with the teachings of the present invention overcomes this apparent deficiency by synchronizing the first and second laser sources such that segments of the broken pattern of elliptical spots produced by first laser source 120a overlap the broken areas between the elliptical spots produced by second laser source 120b. The resulting composite visible line appearing along selected path 110 thus appears to be continuous and unbroken to the human observer. If desired, a cylindrical lens can be used to define the appearance of each spot as a dotted line segment having a straight forward and trailing edge.

In any event, and with continuing reference to FIG. 4, it will be seen that the scanners associated with each corresponding laser source are controlled by a single laser projector control module, indicated generally at reference numerals 82, that resides within host computer system 30. Essentially, single laser projector control module integrates the combined circuitry of a number of equivalent QM2000 controller boards marketed by Pangolin Laser Systems, Inc., Orlando, Fla. Essentially, each QM2000 board includes its own processor and memory storage resources, and is configured to execute a special software program (Pangolin LD2000) to directly control any single ILDA-compliant scanner unit. While acceptable results can be achieved by designated one of these QM2000 boards as a master controller to control the operation of up to three other "slave" controller boards, the integration of multiple such controller modules into a single board structure allows command instructions received from the user interface to be executed in real time. This, in turn, avoids the processing delays which would be experienced when the processing power of the host computer is used to receive, decrypt, and process the line projection commands.

Master control module 82a is configured to assign specific line projection tasks to the scanners (e.g., 121, 123)of each laser sources 120a, 120b, 130a and 130b. Utilizing the Pangolin LD2000 software package, it is possible to define a series of "scenes" each corresponding to a discrete position of the visible line to be projected. Alternatively, the entire field can be modeled as a pattern of spots, and a data table constructed according to which the operation of each laser source is controlled to project the visible line at any location selected by the game official.

Other components of host computer 30 include a conventional central processor unit as, for example, an Intel Pentium 42.0 GHz microprocessor unit, random access memory 86, a hard drive for storage of the operating system and communications program needed to define an interface between wireless user interface 42 and I/O ports 90 via radio frequency (RF) transceiver 43. A set of MIDI function commands input by local console 32 or wireless, handheld user interface 42 cause the program executing on master projector control module 82 to instruct an appropriate group of scanners to move the beams as needed to adjust the visible, composite temporary line from an initially selected position defined by a first "scene" stored in RAM of module 82 and corresponding to a selectable path as path 110 in FIG.

2, to a subsequently selected position defined by a second scene. Thus, for example, in the context of an illustrative football stadium installation, the temporary line may be moved from an initial line of scrimmage—where a game official has just "spotted the ball"—by a set distance often 5 yards by the mere depression of a single pushbutton of user interface 42. This can also include moving the temporary visible line from an old line of scrimmage, forward or backward, to a new line of scrimmage as a result of a penalty assessed against one of the teams.

Figure 5:
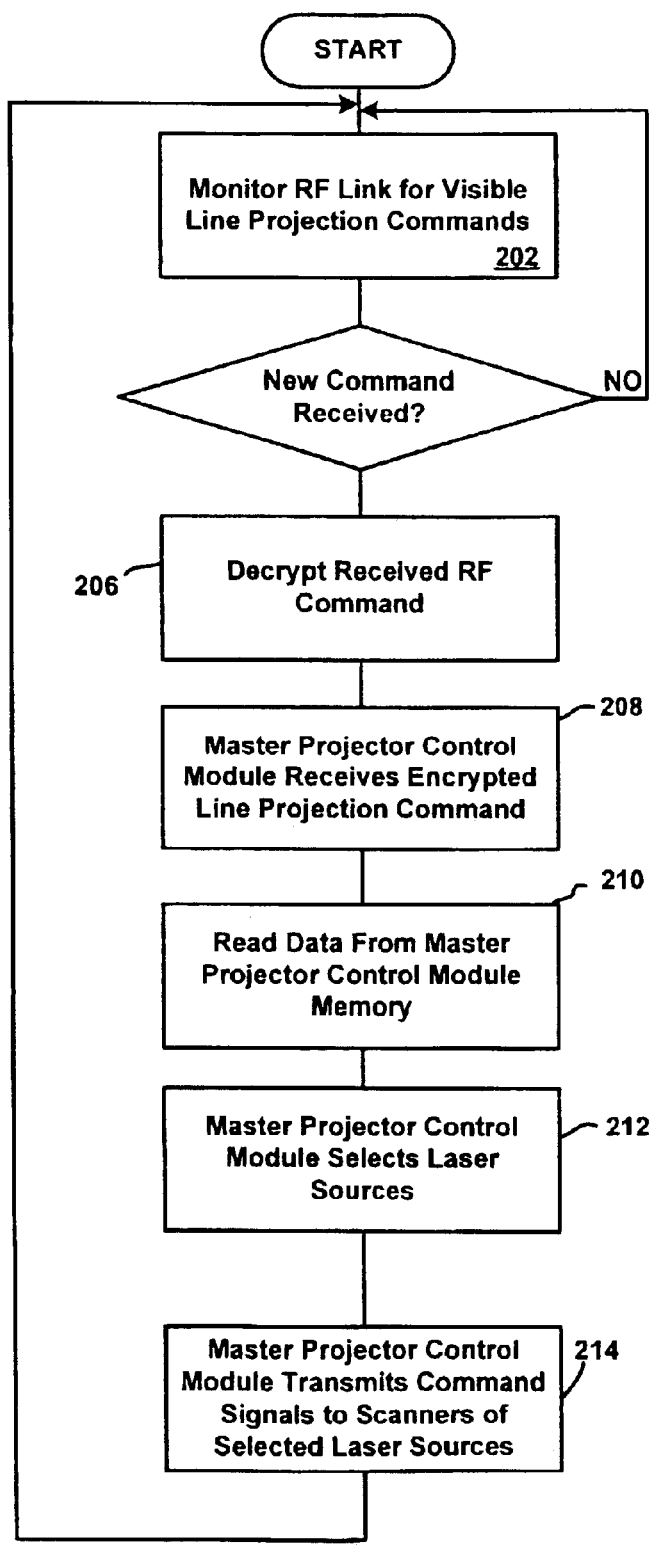
FIG. 5 is a flow chart depicting a sequence of operation for the exemplary system depicted in FIGS. 3 and 4.

With reference now to FIG. 5, an exemplary sequence of operating the illustrative visible line marking system depicted in FIGS. 1–4 will now be described. The process is entered at step 202 wherein the RF link between the hand-held interface used by game officials to input line placement commands and the projector controller board is monitored to detect whether any command signals have been received. At block 204, a determination is made as to whether a command has been received and if so, it is decrypted (block 206) and supplied to the projection controller board (block 208). Data is read from RAM memory on board the projector control module (block 210) and the appropriate set of laser sources needed to generate the visible line at the location corresponding to the input command are selected (block 212). The command signals needed to operate the scanners at each laser source are transmitted by the projector control module to the selected laser sources (block 214). The visible line will continue to be projected at the initial position unless and until a new command is received via wireless transceiver 43 (FIG. 4). It will thus be readily appreciated by those skilled in the art that when a new command is received requiring the line to be moved from, for example, a position within region 102b (FIG. 3) to a position within region 102(a), the projector control module de-energizes first laser source 120a and second laser source 120b, and energizes third laser source 130a and fourth laser source 130b and supplies the latter with the command signals needed to project the visible line at the newly specified location.

It will be readily appreciated by those skilled in the art that various modifications and enhancements are possible. It should also be emphasized that there is no requirement that any pair of laser sources, as first and second laser sources 120a and 120b, be located along a line transverse and perpendicular to the lateral sidelines of the field. Thus, for example, the first laser source might be outside the first lateral side of field region 102b at the twenty-yard line and the second laser source might be outside the second lateral side of region 102b at the thirty-yard line. Still another laser source of the same group might be outside the second lateral side of region 102b at the ten-yard line, such that all or any two laser sources of the group might be used to generate a visible composite line in accordance with the present invention.

Nor is their any requirement that the laser sources be located at the same elevated vertical position relative to the field. It suffices to say that it is considered to be within the level of skill of the ordinary artisan to obtain, whether empirically or by calculation, a juxtaposition of laser sources that is ideally suited to the specific lighting conditions and overall dimensions associated with any particular indoor or outdoor location.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An apparatus for providing at least one temporary visible reference line on a non-smooth surface characterized by a tendency to scatter incident visible light in random and non-uniform manner, comprising:

a first group of laser sources, including
a first laser source disposed at a first elevated location relative to the surface, said first laser source being operative to emit a first laser beam having a wavelength of between 400 nm and 750 nm and to direct visible light from said beam along a selectable path upon the surface so as to form a temporary visible line anywhere within a first region of the surface, and
a second laser source disposed at a second elevated location relative to the surface, said second laser source being operative to emit a second laser beam having a wavelength of between 400 nm and 750 nm and to direct visible light from said second laser beam along the selected path so as to form, with light from said first laser beam, a composite temporary visible line within the first region;

a second group of laser sources, including
a third laser source disposed at a third elevated location relative to the surface and to the same lateral side of the surface as said first laser source, said third laser source being operative to emit a third laser beam having a wavelength of between 400 nm and 750 nm and to direct visible light from said third laser beam along a selectable path upon the surface so as to form a temporary visible line anywhere within a second region of the surface, and
a fourth laser source disposed at a fourth elevated location relative to the surface and at the same lateral side of the surface as said second laser source, said fourth laser source being operative to emit a fourth laser beam having a wavelength of between 400 nm and 750 nm and to direct visible light from said fourth laser beam along the selected path so as to form, with light from said third laser beam, a composite temporary visible line anywhere within the second region; and a controller, responsive to line projection commands, adapted to selectively operate either the first group of laser sources or the second group of laser sources so as to project a composite temporary visible line on the non-smooth surface.

2. The apparatus according to claim 1, wherein each respective laser source comprises a scanner for sweeping a corresponding beam across the surface at a rate of at least 30 Hz.

3. The apparatus according to claim 1, wherein at least one of said first laser source and said second laser source includes a frequency doubled, Q-switched Nd:YAG laser adapted to generate laser pulses at a wavelength of 532 nm.

4. The apparatus according to claim 1, wherein each of said laser sources is adapted to generate a beam of at least 40W.

5. The apparatus according to claim 1, wherein said controller is responsive to user input commands to move the composite temporary line from a first selectable path on a portion of the surface within the first region to a second selectable path on a portion of the surface within the second region.

6. The apparatus according to claim 5, wherein the first region and the second region are contiguous.

7. The apparatus according to claim 1, wherein the beam output by said first laser source is of a wavelength different than the beam output by said second laser source.

8. The apparatus according to claim 1, wherein the first laser source and the second laser source are located on opposite lateral sides of the first region of the surface, and wherein the third laser source and fourth laser source are located on opposite lateral sides of first region of the surface.

9. The apparatus according to claim 1, wherein the composite temporary line projected by the first group of laser sources is a straight line having a length of about fifty three yards and a width of from about four to about eight inches.

10. The apparatus according to claim 1, wherein a visible line formed upon the first region of the surface by the first laser source is a first series of individual line segments and a visible line formed upon the surface by said second laser source is a second series of individual line segments, said first and second laser sources being operable to form collinear, offset line segments with overlapping edges, whereby said composite temporary line is visible as a contiguous solid line along a substantial portion of its length.

11. The apparatus according to claim 1, further including a wireless transceiver adapted to receive encrypted line projection command signals from a remote, hand held device.

12. A method of projecting at least one temporary visible reference line onto a non-smooth surface characterized by a tendency to scatter incident visible light in random and non-uniform manner, comprising the steps of:

in a first receiving step, receiving a first line projection command;

in a first operating step, operating only a first group of laser sources to project a visible line only in a first region of the non-smooth surface in accordance with the received first line projection command;

in a second receiving step, receiving a second line projection command; and in a second operating step, operating only a second group of laser sources to project a visible line only in a second region of the non-smooth surface in accordance with the received second line projection command.

13. The method of claim 12, further including a step of transmitting a signal representative of the first line projection command via a wireless link.

14. The method of claim 13, further including a step of encrypting the first line projection command prior to said transmitting step.

15. The method of claim 12, wherein said first operating step includes operating said first group of laser sources to sweep at least two coherent beams each having a wavelength of from 400 nm to 750 nm across the first region of the surface at a rate of at least 30 Hz.

16. The method of claim 12, wherein said second operating step includes operating said second group of laser sources to sweep at least two coherent beams each having a wavelength of from 400 nm to 750 nm across the first region of the surface at a rate of at least 30 Hz.

17. The method of claim 12, wherein the visible line projected during the first operating step has substantially the same length and width as the visible line projected during the second operating step.

18. The method of claim 17, wherein the visible line projected during each of the first and second operating steps has a length of about fifty three yards and a width of about from four to eight inches.

* * * * *